United States Patent Office 3,640,955
Patented Feb. 8, 1972

---

3,640,955
LINEAR POLYURETHANE OF DI- OR TRI-NUCLE-AR N,N'-DIALKYLDIAMINES AND DI- OR TRI-NUCLEAR DIHYDROXYL COMPOUNDS
Heinrich Krimm, Krefeld-Bochum, Hermann Schnell, Krefeld-Urdingen, and Gunther Lenz, Krefeld, Germany, assignors to Farbenfabriken Bayer Aktiengesellschaft, Leverkusen, Germany
No Drawing. Continuation-in-part of applications Ser. No. 752,136, Aug. 13, 1968, and Ser. No. 780,895, Dec. 3, 1968. This application July 22, 1970, Ser. No. 57,309
Claims priority, application Germany, Aug. 26, 1967, F 53,340; Dec. 8, 1967, F 54,265
Int. Cl. C08g 22/26
U.S. Cl. 260—47 CZ     3 Claims

ABSTRACT OF THE DISCLOSURE

High molecular weight polyurethanes having excellent thermal stability based on condensing di- or trinuclear N,N'-dialkyldiamines in which the nitrogen is aromatically linked with di- or tri-nuclear dihydroxyl compounds and bifunctional carbonic acid derivatives, or by condensing bis-monocarbonic acid derivatives of di- or tri-nuclear N,N'-dialkyldiamines with di- or tri-nuclear aromatic dihydroxyl compounds or by condensing bis-monocarbonic acid derivatives of di- or tri-nuclear aromatic dihydroxyl compounds with di- or tri-nuclear N,N'-dialkyldiamines.

CROSS-REFERENCE TO RELATED APPLICATIONS

This application is a continuation-in-part of co-pending application Ser. No. 752,136 filed on Aug. 13, 1968 and now abandoned and co-pending application Ser. No. 780,895 filed on Dec. 3, 1968 and now abandoned.

It is already known that one can prepare high molecular weight linear polyurethanes by reacting diisocyanates with dihydroxyl compounds, in other words by polyaddition. These linear polyurethanes contain groups of varying stability depending on the nature of the bond. For example, polyurethanes obtained by reaction between aliphatic diisocyanates and aliphatic dihydroxyl compounds are stable up to about 250° C., polyurethanes obtained by reaction between aromatic diisocyanates and aliphatic dihydroxyl compounds are stable up to about 200° C., polyurethanes obtained from aliphatic diisocyanates and divalent phenols are stable up to 180° C. and polyurethanes obtained from aromatic diisocyanates and divalent phenols are stable only up to about 120° C. The stability values under conditions of continuous thermal stress are in the same order as in this grading but are substantially lower than the temperature values.

The preparation of linear polyurethanes which are of sufficiently high molecular weight for practical purposes by reacting diisocyanates with dihydroxyl compounds in the melt gives rise to considerable difficulties since the synthesis is dependent upon the temperature and varies directly with the degradation reaction. Thus, at lower temperatures, the melt viscosity which increases with increasing degree of polyaddition sets a limit on the length of the macromolecules and hence on the optimum properties obtainable for the polyurethanes. The preparation of linear polyurethanes of sufficiently high molecular weight by polyaddition in solvents is in many cases not possible owing to the insufficient solubility of the polyadduct.

Hitherto, the only linear polyurethanes which have the properties of synthetic resins, although of limited thermal stability, which have achieved any commercial importance are those obtained by reaction between aliphatic diisocyanates and divalent alcohols, i.e. polyurethanes which contain the group —NH—CO—O—. It is also known that linear high molecular weight polyurethanes can be prepared by polycondensation (see German patent specification No. 900,136, U.S. patent specification No. 3,189,579). In these cases, however, polyurethanes which have relatively low thermostability are again obtained. The thermostability can be improved if the nitrogen atoms of the urethane groups form part of heterocyclic ring systems and are therefore not aromatically linked (see U.S. patent specification No. 2,731,445).

Surprisingly, it has now been found that high molecular weight polyurethanes which have excellent thermal stability and numerous other valuable properties for synthetic resins can be produced by condensing di- or trinuclear N,N'-dialkyldiamines, in which the nitrogen is aromatically linked, with di- or trinuclear aromatic dihydroxyl compounds and bifunctional carbonic acid derivatives, or by condensing bis-monocarbonic acid derivatives of di- or trinuclear N,N'-dialkyldiamines with di- or trinuclear aromatic dihydroxyl compounds or by condensing bismonocarbonic acid derivatives of di- or trinuclear aromatic dihydroxyl compounds with di- or trinuclear N,N'-dialkyldiamines.

It is therefore one object of the invention to provide novel linear high molecular weight polyurethanes with outstanding thermal stability. Another object of this invention is to provide novel linear high molecular weight polyurethanes with high mechanical strength such as high bending resistance, impact bending resistance, notched impact strength and with a high modulus of elasticity. A further object of this invention is to provide novel linear high molecular weight polyurethanes which are resistant to hydrolysis. Still another object of this invention is to provide thermoplastic polyurethanes with glass transition temperatures of above 150° C. A still further object of this invention is to provide processes for linear high molecular weight polyurethanes of the invention.

The foregoing objects and others which will become apparent from the following description are accomplished in accordance with this invention, generally speaking by providing linear high molecular weight polyurethanes with recurring structural units of the formula

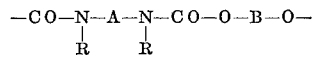

in which:

R is an alkyl radical with 1 to 2 carbon atoms,
A is a divalent di- or trinuclear aromatic radical and
B is a divalent aromatic radical.

Preferred linear hich molecular weight polyurethanes are those consisting essentially of recurring units of the formula

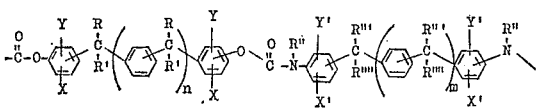

in which:

$n$ and $m$ stand for 0 or 1
R" is methyl or ethyl
R and R' are the same or different alkyl radicals the number of C-atoms of which being such that the total number of C-atoms of the alkylene bridge is 3 to 6
R''' and R'''' are defined at R and R'
X and Y are the same or different and stand for hydrogen in the case where $n$ is 0 and for hydrogen chlorine or bromine in the case where $n$ is 1
X' and Y' are the same or different and stand for hydrogen in the case where $m$ is 0 or for chlorine, bromine or hydrogen in the case where $m$ is 1.

Most preferred polyurethanes are those of above general formula in which:

X, X', Y and Y' stand for hydrogen and
R" stands for methyl

In accordance with a preferred method of preparing the linear high molecular weight polyurethanes of the invention a di- or trinuclear N,N'-dialkyl diamine of the formula

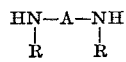

in which:

R is an alkyl radical with 1 to 2 carbon atoms and
A is a divalent aromatic di- or trinuclear radical is reacted with an aromatic dihydroxyl compound of the formula

HO—B—OH in which B is a divalent bi- or trinuclear aromatic radical and bifunctional carbonic acid derivatives of the formula

X—CO—X in which X is halogen, O—$R_4$ ($R_4$=$C_1$-$C_4$ alkyl radicals or $C_4$-$C_{10}$ cycloalkyl radicals or $C_6$-$C_{10}$ aryl radicals) or bis-monocarbonic acid derivatives of di- or trinuclear aromatic N,N'-dialkyl diamines of the formula

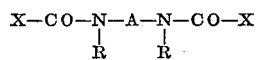

in which:

R is an alkyl with 1 to 2 carbon atoms,
A is a divalent aromatic di- or trinuclear radical and
X is halogen, O—$R_4$ ($R_4$=$C_1$-$C_4$ alkyl radicals or $C_4$-$C_{10}$ cycloalkyl radicals or $C_6$-$C_{10}$ aryl radicals)

are reacted with the aromatic dihydroxyl compounds of the formula

HO—B—OH in which B is a divalent di- or trinuclear aromatic radical or bis-monocarbonic acid derivatives of the aromatic dihydroxyl compounds of the formula

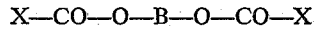

in which:

B is a divalent di- or trinuclear aromatic radical and
X is halogen, O—$R_4$ ($R_4$=$C_1$-$C_4$ alkyl radicals or $C_4$-$C_{10}$ cycloalkyl radicals or $C_6$-$C_{10}$ aryl radicals)

are reacted with the di- or trinuclear aromatic N,N'-dialkyl diamines of the formula

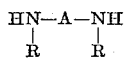

in which:

A is a divalent aromatic di- or trinuclear radical and
R is an alkyl radical with 1 to 2 carbon atoms.

In principle, any di- or trinuclear N,N'-dialkyl diamine of the formula

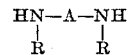

in which:

R is an alkyl radical with 1 to 2 carbon atoms and
A is a divalent aromatic di- or trinuclear radical
may be used as starting material in accordance with the invention. The preferred di-resp. trinuclear N,N'-dialkyl diamines are those of the formula

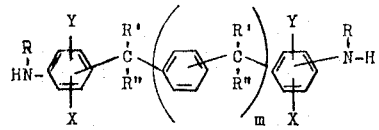

in which:

$m$ stands for 0 or 1,
R is methyl or ethyl,
R' and R" are the same or different alkyl radicals the number of C-atoms of which being such that the total number of C-atoms of the alkylene bridge is 3–6,
X and Y are the same or different and stand for H in the case where $m$ is 0 and for hydrogen, chlorine or bromine in the case where $m$ is 1.

However, it is most preferable to use di-resp. trinuclear aromatic diamines such as 2,2-(4,4'-di-methylaminodiphenyl)-propane;
2,2-(4,4'-di-N-ethylaminodiphenyl)-propane;
2,2-(4,4'-di-N-methylaminodiphenyl)-butane;
2,2-(4,4'-di-N-ethylaminodiphenyl)-pentane;
3,3-(4,4'-di-N-methylaminodiphenyl)-pentane;
α,α'-(4,4'-di-N-methylaminodiphenyl)-p-diisopropylbenzene;
α,α'-(4,2'-di-N-methylaminodiphenyl)-p-diisopropylbenzene,
α,α'-(4,4'-di-N-methylaminodiphenyl)-m-diisopropylbenzene,
α,α'-(4,2'-di-N-ethylaminodiphenyl)-m-diisopropylbenzene,
α,α'-(4,4'-di-N-methylaminodiphenyl)-p-diisobutylbenzene,
α,α'-(4,4'-di-N-methylamino-3,3',5,5'-tetrachlorodiphenyl)-p-diisopropylbenzene,
α,α'-(4,4'-di-N-methylamino-3,3',5,5'-tetrabromodiphenyl)-p-diisopropyl benzene.

Most preferred diamines are however those of above general formula in which:

X and Y stand for hydrogen and
R stands for methyl.

Aromatic dihydroxyl compounds which may be used in the process according to the present invention are of the formula

HO—B—OH in which B is a divalent aromatic radical are in particular

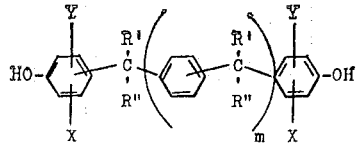

in which:

$m$ stands for 0 or 1,
R' and R" are the same or different alkyl radicals, the number of C-atoms of which being such that the total number of C-atoms of the alkylene bridge is 3–6, X and Y are the same or different and stand for H in the case where m is 0 and for hydrogen chlorine or bromine in the case where m is 1, such as e.g. 2,2-(4,4'-dihydroxydiphenyl)-propane, 2,2-(4,4'-dihydroxydiphenyl)-butane or 3,3-(4,4'-dihydroxydiphenyl) - pentane; α,α' - (4,4'-dihydroxydiphenyl)-p-diisopropylbenzene, α,α' - (4,2' - dihydroxydiphenyl)-p-diisopropylbenzene, α,α' - (4,4' - dihydroxy-3,3'-5,5'-tetrachlorodiphenyl) - p - diisopropyl benzene, α,α'-(4,4'-dihydroxy - 3,3',5,5' - tetrabromodiphenyl) - p-diisopropyl benzene.

Most preferred diphenols are however those of above general formula in which X and Y stand for hydrogen.

Bifunctional carbonic acid derivatives which may be used in the process according to the invention include phosgene, $C_1$–$C_4$-dialkylcarbonates such as diethylcarbonate, dibutylcarbonate, $C_4$–$C_{10}$ - dicycloalkyl-carbonates such as dicyclohexyl-carbonate, cyclic carbonates such as ethylene glycol carbonate and $C_6$–$C_{10}$-diaryl carbonates such as diphenylcarbonate or dinaphthyl carbonate. Diphenyl carbonate is preferably used. Bis-monocarbonic acid derivatives of trinuclear N,N'-dialkyldiamines or of aromatic dihydroxy compounds include their bis-carbamic acid halides such as bromides, jodides, fluorides, preferably chlorides, bis-carbamic acid $C_1$–$C_4$-alkyl- or $C_4$–$C_{10}$-cycloalkyl esters such as methyl-, ethyl-, propyl-, butyl-, cyclobutyl-, cyclohexyl- and dekahydronaphthyl-esters and bis-alkyl $C_1$–$C_4$- or aryl-($C_6$–$C_{10}$) carbonates such as phenyl- and naphthyl carbonates, preferably bisphenyl carbonates.

The bis-monocarbonic acid derivatives which can be used as starting materials may, for example, be prepared by reacting aromatic di- or trinuclear N,N'-dialkyldiamines or dihydrocyl compounds with excess phosgene or with alkyl- or aryl chlorocarbonic acid esters in the presence of acid binding agents such as tertiary amines or in the presence of solutions of alkali metal carbonates or alkali metal hydroxides, if desired in the presence of inert solvents.

The polycondensation reaction according to the invention may be carried out in various ways. If one is using the reaction between N,N'-dialkyl diamines and aromatic dihydroxyl compounds in the presence of bifunctional carbonic acid derivatives, one may, for example, introduce phosgene at 10 to 100° C. into a solution or suspension of a mixture of N,N'-dialkyldiamine and dihydroxyl compound in an inert solvent such as benzene, toluene, methylene chloride, ethylene chloride, chloroform or chlorobenzene, either in homogeneous solution in the presence of the stoichiometrical quantity of a tertiary amine such as triethylamine, dimethylcyclohexylamine, dimethylbenzylamine, dimethyl aniline or pyridine, or in a binary reaction medium, using a solution of an alkali metal carbonate or an alkali metal hydroxide as base, until a viscous solution of the high molecular weight polyurethane has been formed.

Alternatively, the polycondensation may be carried out by reacting, for example, a previously prepared biscarbamic acid chloride of an N,N'-dialkyldiamine in the presence of acid binding agents with a stoichiometric quantity of a dihydroxyl compound. When this method is employed, a solution of the bascarbamic acid chloride, e.g. in one of the inert solvents already mentioned, is introduced dropwise into a vigorously stirred solution of the dihydroxyl compound in a homogeneous or binary reaction medium in the presence of an equimolar quantity of a base, e.g. a tertiary amine or a solution of an alkali metal carbonate or an alkali metal hydroxide at 10 to 100° C. The reaction is allowed to proceed until the desired extent of polycondensation, i.e. the necessary solution viscosity has occurred.

It is particularly advantageous, if when carrying out the method described above in process of the invention, one reacts the bischlorocarbonic acid ester of the aromatic dihydroxyl compound with the N,N'-dialkyldiamine. Particularly high molecular weight products are obtained in this case.

If dialkyl or diaryl carbonates, preferably diphenyl carbonates are used instead of phosgene in the polycondensation of N,N'-dialkyl diamines and aromatic dihydroxyl compounds a mixture of equimolar quantities of the N,N'-dialkyldiamine and the dihydroxyl compound as well as the stoichiometric quantity of diphenyl carbonate are generally polycondensed, preferably in the presence of small quantities of a catalyst, preferably an alkaline catalyst, in a nitrogen atmosphere at 180 to 320° C. with simultaneous removal of the phenol formed by distillation under reduced pressure, e.g. under a high vacuum towards the end of the reaction, until the desired molecular weight is achieved.

The reaction temperature employed depends on the amount of catalyst, if used, and in many cases is initially 180 to 250° C., and is advantageously increased to 280 to 320° C. towards the end of the polycondensation.

If catalysts are used, these are preferably alkaline catalysts such as alkali metals, hydroxides, oxides, alcoholates, phenolates, and alkyl carboxylates and aryl carboxylates of alkali metals or alkaline earth metals. The quantity of these catalysts used in advantageously 0.0001 to 0.1%, based on the sum of bifunctional compounds put into the process.

Instead of reacting the N,N'-dialkyldiamines and aromatic dihydroxyl compounds with diphenyl carbonate, polycondensation may also be carried out by reacting a bismonocarbonic acid ester, preferably the bismonocarbonic acid phenyl ester of one of the two other components with the corresponding bisfunctional second component. If biscarbamic acid phenyl esters of N,N'-dialkyldiamines are used, they are polycondensed in the melt in an equimolar mixture with an aromatic dihydroxyl compound by the procedure indicated above under the conditions described, phenol being split off in the process.

The choice of aromatic dihydroxyl compound is of major importance when carrying out the process by this method. One should not use dihydroxyl compounds which undergo decomposition under the conditions mentioned, for example in the presence of ester interchange catalysts, which would prevent synthesis of a high molecular weight product.

It is therefore especially advantageous to carry out the procedure in such a manner that polycondensation is achieved by ester interchange between biscarbonates, preferably bisphenylcarbonates of the aromatic dihydroxyl compounds in the presence of a di- or trinuclear N,N'-dialkyldiamine, phenol being split off in the process, since bisphenols which are themselves capable of splitting up can be stabilised by formation of bisphenylcarbonate. This method of carrying out the process corresponds to that employed for reacting biscarbamic acid esters with dihydroxyl compounds. As a rule, the same conditions as regards temperature, catalyst if used and pressure are observed as has been indicated for the polycondensation of diphenylcarbonate with N,N'-dialkyldiamines and dihydroxyl compounds.

The products of the invention have in general a number of structural units as already defined in the range from about 15 to about 300. They have numerous valuable properties which permit a wide range of applications. In contrast to the polyurethanes which are bound purely aromatically, e.g. those obtained from aromatic diisocyanates and aromatic dihydroxyl compounds, and which have the lowest temperature resistance compared with other polyurethanes obtained from diisocyanates and diols, as described above, the products of the process of this invention which also have a purely aromatic urethane bond, are characterised by exceptionally high thermal stability which enables the product to be produced and worked up at temperatures far above 300° C.

In addition, the products of the invention have high mechanical strengths, such as high bending resistance, impact bending resistance, notched impact strength and ball indentation hardness as well as a high modulus of elasticity. The high melting points enable the polymers to be used over a wide temperature range. Furthermore, the products of the process have advantageous electrical properties. One of the most important properties of the products of the invention is their excellent thermoplastic processability resp. their high glass transistion temperatures which when determined according to Journal of Polymer Science C. Polymer Symposia 6, page 17 Interscience Publichers, 1964, is generally above 150° C.

Another advantageous and characteristic property of the products of the invention is their resistance to hydrolysis in, for example, aqueous alkali metal solutions and solutions of ammonia or amines. Even after the products have been boiled for a number of days in dilute sodium hydroxide solution, no loss in weight or deterioration in mechanical strength is observable. The products have a crystalline structure, the nature of which depends on their constitution. This behaviour can be varied within wide limits by carrying out mixed condensation of different N.N′-dialkyldiamines and dihydroxyl compounds.

The products of the invention thus constitute synthetic resins with especially valuable properties. They can be orientated by stretching and are therefore suitable for use in the production e.g. of high temperature resistant fibres and films. Coated refractory films can be produced from solutions in suitable solvents of these polymers. The products may also be used in the production of laminates, mouldings and foams. The products may therefore be used e.g. for electrical insulation, in aircraft construction and in the space flight industry.

Shaped articles of any desired type can be produced by working up the products thermoplastically, e.g. in extruders or injection moulding machines, in which one may employ high moulding temperatures.

Plasticisers, dyes, pigments and fillers, as well as reinforcing elements such as glass fibers, may also be incorporated in the products.

EXAMPLE 1

A mixture of 27.9 g. (0.075 mol) of $\alpha,\alpha'$-(4,4′-di-N-methylaminodiphenyl)-p-diisopropylbenzene and 35.1 g. (0.075 mol) of bisphenylcarbonate of 2,2-bis-(p-hydroxyphenyl)-propane is melted under an atmosphere of nitrogen and heated to 250° C. at 100 mm. Hg. during which procedure phenol is given off. The reaction mixture is heated in stages to 300° C. in the course of 3 hours and the pressure is then reduced over a period of one hour to 20 mm. Hg and is maintained at this level for one hour. Condensation is then completed in the course of a further 5 hours at 300° C. and 0.05 mm. Hg. 14.0 g. of phenol, in all are split off. A tough, rigid polyurethane which is soluble in methylene chloride is obtained. Films cast from this solution are elastic, clear and firm. The glass transition temperature, determined by differential thermoanalysis, is 156° C. The decomposition temperature is in the region of 375° C.

EXAMPLE 2

After the addition of 0.2 ml. of triethylamine as catalyst to a mixture of a solution of 37.2 g. (0.1 mol) of $\alpha,\alpha'$-(4,4′-di-N-methylaminodiphenyl) - p - diisopropylbenzene in 400 ml. of methylene chloride and a solution of 8.8 g. (0.22 mol) of sodium hydroxide in 100 ml. of water, the bischlorocarbonic acid ester of $\alpha,\alpha'$-(4,4′-dihydroxydiphenyl)-p-diisopropylbenzene in 300 ml. of methylene chloride is added dropwise with vigorous stirring at 15 to 35° C. in the course of one hour. The reaction mixture is then left to react for another 2 to 3 hours until a polyurethane having a sufficiently high molecular weight is obtained. This can be recognised by increased solution viscosity. A clear, colourless product which has a relative viscosity of 1.5 (in methylene chloride) and a glass transition temperature of 155° C. is thus obtained. The decomposition temperature is about 375° C.

EXAMPLE 3

37.2 g. (0.1 mol) of a mixture of $\alpha,\alpha'$-(4,4′-di-N-methylaminodiphenyl) - p - diisopropylbenzene and $\alpha,\alpha'$-(4,2′-di-N-methylaminodiphenyl) - p - diisopropylbenzene in methylene chloride solution are reacted with 48 g. (0.102 mol) of the bischlorocarbonic acid ester of $\alpha,\alpha'$-(4,4′-dihydroxydiphenyl) - p - diisopropylbenzene in the presence of 8.8 g. (0.22 mol) of sodium hydroxide dissolved in 100 ml. of water and 0.2 ml. of triethylamine as catalyst under the conditions indicated in Example 3. A clear, colourless polyurethane having a relative viscosity of 1.3 (in methylene chloride) and a glass transition temperature of 148° C. is obtained. The decomposition temperature is about 370° C.

EXAMPLE 4

A solution of 35.3 g. (0.1 mol) of the bischlorocarbonic acid ester of 2,2-bis-(p-hydroxyphenyl) - propane in 200 ml. of methylene chloride is introduced dropwise with vigorous stirring at 15 to 35° C. over about one hour into a mixture of a solution of 25.4 g. (0.1 mol) of 2,2-bis-(p-methyl-aminophenyl)-propane in 300 ml. of methylene chloride, a solution of 8.8 g. (0.22 mol) of sodium hydroxide in 80 ml. of water, and 0.2 ml. of triethylamine as catalyst. The reaction mixture is left to react at the same temperature for another 2 to 3 hours until the organic solution of the resulting polyurethane has reached the required viscosity. A clear, colourless product which has a relative viscosity (in methylene chloride) of 1.6 and which can be worked up into shaped articles such as fibres, films or fouls both from solution and from the melt is obtained. The glass transition temperature according to the DTA method is 155° C.; the decomposition temperature is above 360° C.

EXAMPLE 5

A mixture of 37.6 g. (0.076 mol) of the phenyl ester of diphenyl-2,2-propane - bis - N - methylcarbamic acid, 26.3 g. (0.076 mol) of $\alpha,\alpha'$-di-p-hydroxyphenyl - p - diisopropylbenzene and 2 mg. of KOH is melted under an atmosphere of nitrogen and heated to 260° C. at 100 mm. Hg at which stage phenol starts to split off. The temperature is raised stepwise to 300° C. in the course of 1½ hours, the pressure is reduced to 20 mm. Hg in 45 minutes and these conditions are maintained for a further 30 minutes and the reaction is completed by one hour's heating at 300° C. under 0.08 mm. Hg. 14.1 g. of phenol are split off. A tough elastic solid polyurethane is obtained which is soluble in methylene chloride. The solution of this product in methylene chloride can be cast to form a clear elastic film. The glass transition point determined by the DTA method is 156° C. The decomposition temperature is 370° C.

What is claimed is:

1. A polyurethane resin consisting essentially of recurring units of the formula

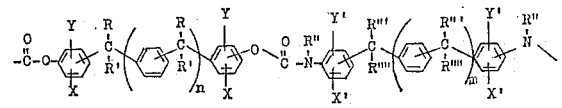

in which n and m stand for 0 or 1

R″ is methyl or ethyl

R and R′ are the same or different alkyl radicals the number of C-atoms of which being such that the total number of C-atoms of the alkylene bridge is 3 to 6

R‴ and R⁗ are defined as R and R′

X and Y are the same or different and stand for hydrogen in the case where n is 0 and for hydrogen, chlorine or bromine in the case where n is 1

X' and Y' are the same or different and stand for hydrogen in the case where $m$ is 0 or for chlorine, bromine or hydrogen in the case where $m$ is 1.

2. A polyurethane resin according to claim 1 in which X, X', Y and Y' stand for hydrogen.

3. A polyurethane resin according to claim 2 in which all nitrogen atoms are substituted by methyl groups.

References Cited

UNITED STATES PATENTS

| | | | |
|---|---|---|---|
| 2,888,440 | 5/1959 | Frazer et al. | 260—77.5 |
| 2,987,494 | 6/1961 | Black | 260—30.8 |
| 3,254,056 | 5/1966 | Lovell | 260—77.5 |
| 3,418,275 | 12/1968 | Stephens | 260—47 |

WILLIAM H. SHORT, Primary Examiner

L. L. LEE, Assistant Examiner

U.S. Cl. X.R.

117—161 KP; 161—190; 260—2.5 AM, 338 UB, 37 N, 47 CB, 77.5 B; 264—51